UNITED STATES PATENT OFFICE.

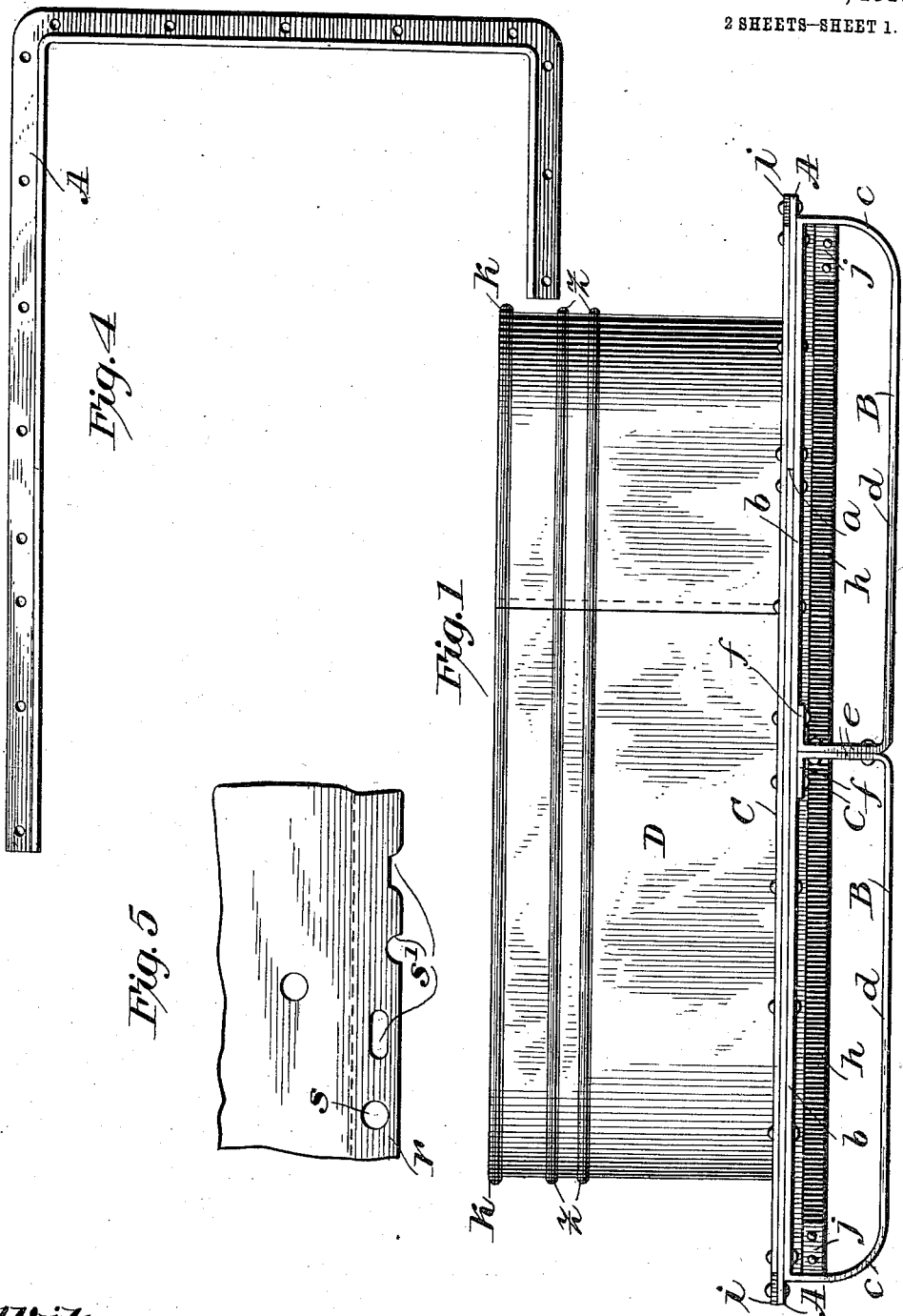

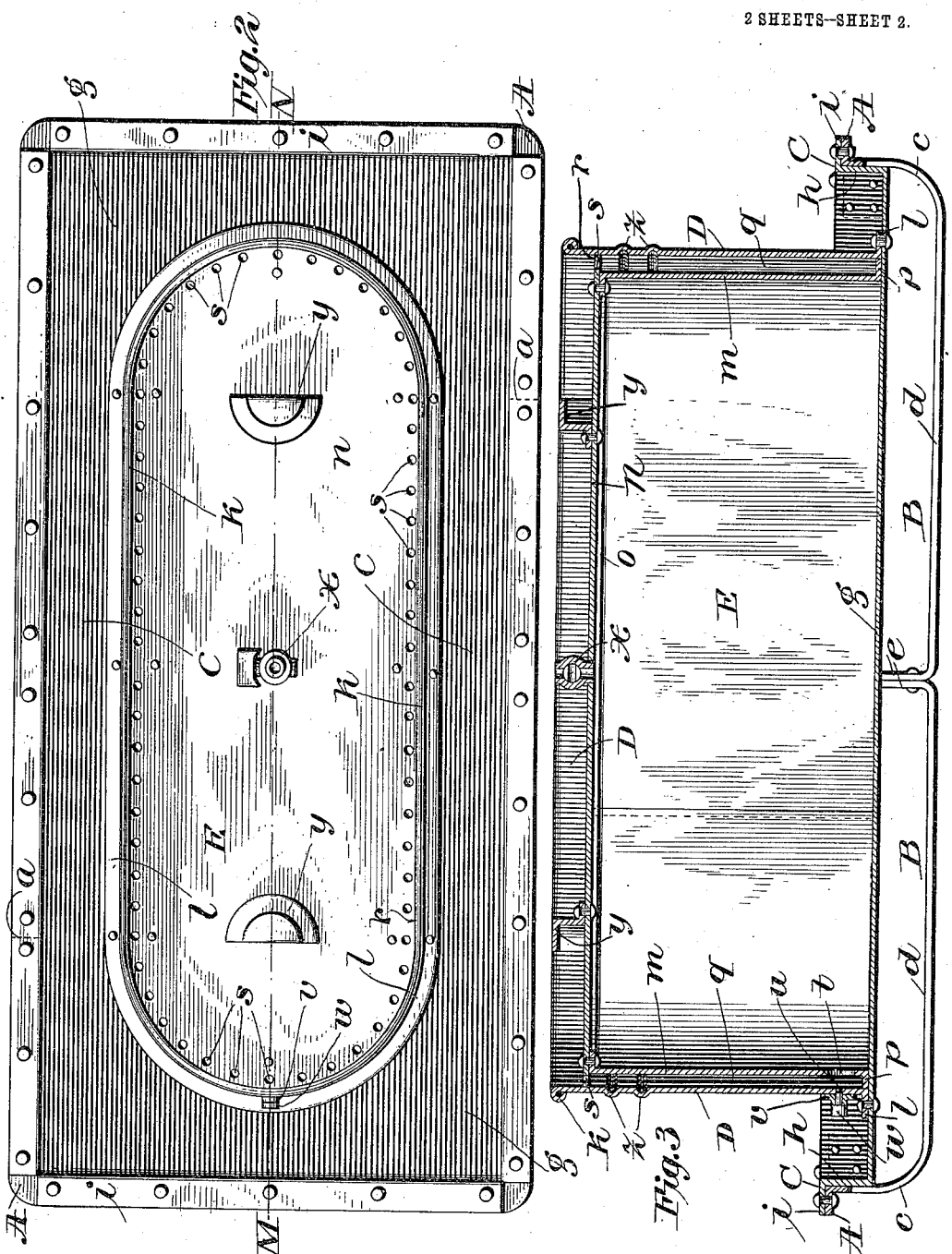

RANKIN C. WALKUP, OF CRAWFORDSVILLE, INDIANA.

PORTABLE WATER-FOUNTAIN.

1,011,290. Specification of Letters Patent. Patented Dec. 12, 1911.

Application filed June 21, 1911. Serial No. 634,638.

*To all whom it may concern:*

Be it known that I, RANKIN C. WALKUP, a citizen of the United States, residing at Crawfordsville, in the county of Montgomery and State of Indiana, have invented certain new and useful Improvements in Portable Water-Fountains, of which the following is a specification.

My invention relates to the class of portable water fountains commonly known as barometric fountains in which type the water gravitates from a central supply reservoir to a determined limit or level in an open drinking-pan for the purpose of providing a convenient supply of fresh water for the smaller domestic animals, such as swine, sheep, etc., and in which the water gravitates from the central supply reservoir to such limit or level in the drinking-pan only as used by such stock which enables the progressive husbandman to provide a daily supply of sanitary fresh water.

The primary object of my invention is the production of a portable water fountain of the above described character and with this object in view my invention consists in the various novel features of construction, combination and arrangement of the several parts particularly set out in the following description and claims which present the best embodiment of my invention known to me at this time.

Referring to the accompanying drawings, forming a part of this specification, in which like letters and numerals of reference indicate corresponding parts throughout the several views;—Figure 1 is a side elevation of my invention entire. Fig. 2 is a top plan of the same. Fig. 3 is a vertical half section of the same, taken on the line M, N, Fig. 2. Fig. 4 is a skeleton bottom plan of an L-shaped angle-iron section of the supporting-frame. Fig. 5 is a detail showing a full size portion of the outstanding perforated flange of the removable inner section of the water supply reservoir illustrating modifications of the perforations which may be practiced in this particular feature of my invention.

In the embodiment of my invention I use an elongated water supply reservoir centrally mounted upon a combined portable drinking-pan and supporting-frame comprising a pair of L-shaped angle-iron sections A arranged end to end, a pair of runners B rigidly mounted at either side and immediately underneath the L-shaped angle-iron sections A and a portable drinking-pan C rigidly mounted upon and within the opening formed by the L-shaped angle-iron sections A.

The elongated water supply reservoir of my portable water fountain comprises an upstanding outer section D rigidly mounted upon the portable drinking-pan C and a removable inner section E normally resting upon the bottom of the portable drinking-pan C and within the open receptacle of the rigid upstanding outer section D. The L-shaped angle-iron sections A, arranged end to end at the points $a$, provide a suitably rigid reinforcement for my combined portable drinking pan and supporting-frame.

Each runner B of my combined portable drinking-pan and supporting-frame is formed of an integral blank of bent flat-iron and comprises an upper horizontal portion $b$, suitably curved end portions $c$, ground tread portions $d$ and central vertical reinforcing portions $e$ and $f$, for providing suitably rigid runners of great rigidity. The central vertical portions $e$ are securely joined by ordinary through-rivets secured in suitable openings therein at approved intervals.

The portable drinking-pan C, formed of an integral rectangular blank of bent sheet metal, has a closed bottom portion $g$, upbent side and end portions $h$ and laterally-bent flange portions $i$ which normally overlie and depend upon the L-shaped angle-iron sections A for providing a rigidly combined open topped drinking-pan and supporting-frame. The corners of the up-bent side and end portions $h$ are securely closed and reinforced by the overlap portions $j$ of the up-bent end portions $h$ which are securely joined by ordinary through-rivets secured in suitable openings therein at approved intervals.

The L-shaped angle-iron sections A, the runners B and the portable drinking-pan C, formed and assembled as shown and described, are rigidly joined by means of ordinary through-rivets secured in suitable openings at approved intervals in their adjacent dependent portions for providing a rigidly combined portable drinking-pan and supporting-frame of my invention adapted to securely maintain and transport a maximum water supply as its use may occasion and require.

The rigid upstanding outer section D of the water supply reservoir is formed of an integral blank of bent sheet metal and has a peripheral bead $k$ for reinforcing its upper rim and a lateral peripheral flange $l$ for reinforcing its lower rim and for rigidly securing it upon the bottom portion of the portable drinking-pan C by ordinary through-rivets secured in suitable openings therein at approved intervals. The removable inner section E, preferably formed of suitable blanks of bent sheet metal, comprises an upstanding part $m$ and a top part $n$. The upstanding part $m$ is provided with an instanding flange $o$ for reinforcing its upper rim and a lower outstanding flange $p$ for reinforcing its lower rim and for normally nesting within the open receptacle inside of the vertical wall of the outer section D and is suitably reduced in circumference for providing an approved circumferential space $q$ between it and the inner vertical wall of the outer section D for affording a suitable water intake space between the vertical walls of said sections. The top part $n$ is rigidly secured upon the upper instanding flange $o$ by ordinary through-rivets secured in suitable openings therein at approved intervals and is provided with a perforated peripheral flange $r$ for normally nesting it within the inner vertical wall of the outer section D. The perforated peripheral flange $r$ is provided with a series of small annular perforations $s$ at approved intervals for the purpose of affording about the upper periphery of the inner section E a suitable water inlet into the circumferential space $q$.

In practice I do not wish to be limited to a perforated peripheral flange integral with the top part $p$ and provided with a series of small annular perforations $s$ at approved intervals therein as shown in Figs. 2 and 3 as it will be readily apparent that I may with equal advantage provide any approved form of perforation through the body or in the edge of the peripheral flange as illustrated by the perforations $s'$ in Fig. 5 for the purpose of affording a suitable water inlet about the upper periphery of the removable inner section E. It will further be clearly obvious that I may with similar advantage provide modified forms of this peripheral flange, either integral with or independent of the upstanding part $m$ and the top part $n$, for the purpose of providing suitable means for securely nesting the removable inner section E inside of the inner vertical wall of the outer section D.

The provision of the removable inner section E with the perforated flange $r$ about its upper periphery and with the outstanding flange $p$ about its lower periphery flush with the inner vertical wall of the outer section D entirely obviates any vibratory movement of the removable inner section within the outer section D and any beating of the removable inner section E against the inner vertical wall of the outer section D while transporting my portable water fountain from place to place as its use may occasion and require.

The upstanding part $m$ of the removable inner section E is provided with a small annular opening $t$ at an approved interval above the bottom portion of the drinking-pan C for affording a suitable water inlet and outlet opening therein and the outer section D is provided with a suitable annular opening $u$ immediately opposite the annular opening $t$ of the removable inner section E for the purpose of affording a suitable opening for the water to gravitate to the open in the drinking-pan C. An ordinary cylindrical collar $v$ is rigidly secured to the outer section D immediately over the annular opening $u$ for the purpose of adapting it to be closed when desired by the use of an ordinary plug or stopper $w$.

An ordinary air-cock $x$ of common construction is centrally mounted upon the top part $n$ of the removable inner section E for a well known purpose. A pair of ordinary hand-holds $y$ are rigidly secured to the top part $n$ for the purpose of conveniently removing the inner section E from its normal position and for replacing it as the occasion may require. $z$ represents a pair of circumferential corrugations in the upper body portion of the outer section D.

It will be observed here that the end portions of the upstanding outer section D and the removable inner section E of the elongated supply reservoir are annular-shaped circumferentially for the purpose of obtaining increased rigidity and that the top part $n$ of the inner section E normally rests below the peripheral bead $k$ of the outer section D for the purpose of providing a suitable receiving receptacle for the water during the operation of charging or filling the water supply reservoir.

The lap-seams and rivet-joints of the outer section D, the removable inner section E and the drinking-pan C are made securely air-tight by the use of common solder.

The primary function of all stock-watering-devices is to provide the smaller domestic animals with a convenient supply of sanitary fresh water and to accomplish this result the device itself must be sanitary in both construction and operation as its constant use and exposure unavoidably subjects it to the accumulation of sediment which, during the hot months of the year, may readily become a prolific incubator for bacteria and disease. Heretofore no particular provision for convenient sanitation has been embodied in any stock-watering-device and in the above construction this common defect has been entirely obviated by the provision of a water supply reservoir in two sections, namely; a rigid upstanding outer section D and a readily removable inner section E. By the removal of the inner section E all parts of my portable water fountain are readily accessible for convenient and effective sanitation. Heretofore it has further been attempted to make this class of stock-watering-devices securely and conveniently portable solely by the provision of suitable runners but the extreme mobility of the water in the water supply tanks or reservoirs frequently develops such force and momentum, occasioned and accelerated by the broken tread of the draft animals commonly used for transporting it from place to place, that the entire device is either wrecked or prematurely impaired for service. In the above construction this result is more completely avoided, than has been done heretofore, by the provision of the removable inner section E with the circumferential outstanding flanges $r$ and $p$ about its upper and lower periphery nesting flush with the inner vertical wall of the outer section D which obviates any vibratory movement or beating of the inner section E against the inner vertical wall of the outer section D while moving my portable water fountain from place to place.

The elongated water supply reservoir of my portable water fountain is charged or filled by opening the air-cock $x$, securely closing the cylindrical collar $v$ with the plug or stopper $w$ and delivering the water over the top part $n$ of the inner section E from whence it gravitates through the small annular perforations $s$ of the peripheral flange $r$ into the circumferential space $q$ between the vertical walls of the outer section D and the removable inner section E and through the small annular opening $t$ into the inner section E until the same is charged or filled to the top part $n$ or as may be desired. Upon closing the air-cock $x$ and removing the plug or stopper $w$ the water gravitates again through the annular openings $t$ and $u$ to the open in the drinking-pan C and to a plane therein even with the upper sides of these annular openings until the water in the inner section E above these annular openings gravitates entirely to the open in the drinking-pan C. The water supply in the inner section E gravitates to the open only as the water is removed from the open in the drinking-pan C.

The water supply in my portable water fountain may be securely retained, while transporting it from place to place, by closing the air-cock $x$ and the cylindrical collar $v$ with the plug or stopper $w$. Ordinary link-chains or pull-rods of common usage may be attached at either end of the runners B of my invention for transporting it from place to place, as the convenience of the user may approve and require.

In the above construction I produce a most durable and efficient portable water fountain of great convenience and advantage to husbandmen for providing a ready supply of sanitary fresh water for the smaller domestic animals which may be renewed as often as the contents are used for such purpose.

Having made a full, clear and exact disclosure of the peculiar construction, combination and arrangement of the several parts of my invention, and set forth the operation and advantages thereof, what I claim as new and desire to secure by Letters Patent, is—

1. In a portable water fountain, the combination of a portable drinking-pan having an open top, a closed bottom and laterally-bent flange portions which normally overlie and depend upon L-shaped angle-iron sections arranged end to end, L-shaped angle-iron sections arranged end to end adjacent and immediately underneath the laterally-bent flange portions of the portable drinking-pan and runners rigidly mounted at either side and immediately underneath the L-shaped angle-iron sections and comprising upper horizontal portions, suitably curved end portions, ground tread portions and central vertical reinforcing portions, formed of integral blanks of bent flat-iron, for the purpose of providing a rigidly combined portable drinking-pan and supporting-frame, substantially as described.

2. In a portable water fountain, the combination of a portable drinking-pan having an open top, a closed bottom and laterally-bent flange portions which normally overlie and depend upon L-shaped angle-iron sections arranged end to end, L-shaped angle-iron sections arranged end to end adjacent and immediately underneath the laterally-bent flange portions of the portable drinking-pan and runners rigidly mounted at either side and immediately underneath the L-shaped angle-iron sections as and in the manner set forth, an elongated water supply reservoir centrally mounted upon the closed bottom and within the open top of the portable drinking-pan and comprising an outer upstanding section having an open top and a lateral peripheral flange on its lower rim rigidly secured upon the closed bottom of the portable drinking-pan and a circumferentially-reduced removable inner section having a closed top and an open bottom normally resting upon the closed bottom of the portable drinking-pan and within the open receptacle of the rigid upstanding outer section, circumferential outstanding flanges mounted about the upper and lower periphery of the removable inner section adapted to nest flush against the inner vertical wall of the rigid outer section for preventing any vibratory movement or beating of inner section against the inside wall of the rigid outer section while transporting same from place to place, and water controlling means comprising an ordinary air-cock centrally mounted upon the top part of the removable inner section, annular perforations provided at approved intervals in the upper outstanding flange of the removable inner section, a circumferential space between the walls of the removable inner section and the rigid outer section, an annular opening through the wall of the removable inner section at an approved interval above the closed bottom of the portable drinking-pan and an annular opening provided with a cylindrical collar and a removable plug or stopper through the wall of the rigid outer section immediately opposite the annular opening through the wall of the removable inner section, for automatically gravitating the supply water into the inner section for charging or filling it and for automatically gravitating the water supply from said inner section to the drinking-pan and only as the water is removed from the open therein, substantially as specified.

RANKIN C. WALKUP.

Witnesses:
OLIVER U. PERRIN,
ICELONE POWELL.

Copies of this patent may be obtained for five cents each, by addressing the "Commissioner of Patents, Washington, D. C."